United States Patent
Kong et al.

(10) Patent No.: US 10,826,847 B2
(45) Date of Patent: Nov. 3, 2020

(54) PORT AUTO-NEGOTIATION METHOD AND DEVICE

(71) Applicant: Huawei Technologies Co., Ltd., Shenzhen (CN)

(72) Inventors: Weibin Kong, Dongguan (CN); Jianzhao Li, Shenzhen (CN); Guolan Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/399,500

(22) Filed: Apr. 30, 2019

(65) Prior Publication Data

US 2019/0260640 A1     Aug. 22, 2019

Related U.S. Application Data

(63) Continuation of application No. PCT/CN2017/088528, filed on Jun. 15, 2017.

(30) Foreign Application Priority Data

Oct. 31, 2016   (CN) .......................... 2016 1 0933367

(51) Int. Cl.
*H04L 12/24* (2006.01)
*H04L 12/935* (2013.01)
*H04L 12/28* (2006.01)

(52) U.S. Cl.
CPC .......... *H04L 49/3054* (2013.01); *H04L 12/28* (2013.01); *H04L 12/2801* (2013.01);
(Continued)

(58) Field of Classification Search
CPC ............. H04L 49/3054; H04L 41/0886; H04L 41/0803; H04L 12/28; H04L 41/0853;
(Continued)

(56) References Cited

U.S. PATENT DOCUMENTS

| 9,172,602 B1 * | 10/2015 | Dropps ............... H04L 49/3054 |
| 2005/0002390 A1 | 1/2005 | Kim et al. |
| 2014/0105014 A1 | 4/2014 | Conway et al. |

FOREIGN PATENT DOCUMENTS

| CN | 1574751 A | 2/2005 |
| CN | 101068117 A | 11/2007 |

(Continued)

OTHER PUBLICATIONS

Hurwitz, "S800 Base-T Auto-Negotiation," XP017622360, pp. 1-24 (Apr. 2003).

(Continued)

*Primary Examiner* — Vinncelas Louis
(74) *Attorney, Agent, or Firm* — Leydig, Voit & Mayer, Ltd.

(57) ABSTRACT

A port auto-negotiation method and a device used for implementing port auto-negotiation between high-speed Ethernet devices are provided. The method performed by a first device includes: configuring a first port of the first device as four subports, where each of the four subports includes a differential transceiver channel; determining from the four subports, at least one subport whose differential transceiver channel operates normally, and selecting some or all of the at least one subport as a normal subport; sending capability information of the first port to a second device by using the normal subport, and receiving, by using the normal subport, capability information of a second port of the second device; and determining operating statuses of the four subports based on the capability information of the first port and of the second port.

18 Claims, 3 Drawing Sheets

(52) U.S. Cl.
CPC ...... *H04L 41/0803* (2013.01); *H04L 41/0813* (2013.01); *H04L 41/0853* (2013.01); *H04L 41/0886* (2013.01)

(58) Field of Classification Search
CPC ............. H04L 12/2801; H04L 41/0813; H04L 41/0876
See application file for complete search history.

(56) References Cited

FOREIGN PATENT DOCUMENTS

| | | |
|---|---|---|
| CN | 104283816 A | 1/2015 |
| EP | 1848156 A1 | 10/2007 |
| WO | 2015032309 A1 | 3/2015 |
| WO | 2015116071 A1 | 8/2015 |
| WO | 2016007514 A1 | 1/2016 |

OTHER PUBLICATIONS

"IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment 4: Media Access Control Parameters, Physical Layers, and Management Parameters for 40 Gb/s and 100 Gb/s Operation," IEEE Std 802.3ba™,pp. 1-457, Institute of Electrical and Electronics Engineers, New York, New York (Jun. 2010).

"IEEE Standard for Ethernet SECTION SIX," IEEE Std 802.3™, pp. 1-400, Institute of Electrical and Electronics Engineers, New York, New York (2012).

"IEEE Standard for Ethernet SECTION SIX," IEEE Std 802.3™, pp. 1-699, Institute of Electrical and Electronics Engineers, New York, New York (2015).

\* cited by examiner

PORT AUTO-NEGOTIATION METHOD AND DEVICE

CROSS-REFERENCE TO RELATED APPLICATIONS

This application is a continuation of International Application No. PCT/CN2017/088528, filed on Jun. 15, 2017, which claims priority to Chinese Patent Application No. 201610933367.8, filed on Oct. 31, 2016. The disclosures of the aforementioned applications are hereby incorporated by reference in their entireties.

TECHNICAL FIELD

Embodiments of the present invention relate to the field of Ethernet, and in particular, to a port auto-negotiation method and a device.

BACKGROUND

A high-speed Ethernet is specifically an Ethernet in which a data transmission rate of a device port reaches 40 gigabits per second (Gbps, G) or 100G. The two data transmission rates can meet different requirements of a server and a network. 40G is mainly suitable for server application and storage application, and 100G is mainly suitable for aggregation application and core network application.

Currently, a 100G port may be compatible with data transmission rates of 40G and 10G, and a 40G port may be compatible with a data transmission rate of 10G. If a 100G port of one device needs to interface with a 40G port of another device, the ports need to be configured manually. A current high-speed Ethernet standard does not define a method for performing port rate auto-negotiation, referred to as port auto-negotiation below, between high-speed Ethernet devices. Port auto-negotiation indicates that devices at both ends of a link exchange negotiation information, such as a device operation mode, and then perform automatic port configuration according to the negotiation information of the devices at the both ends, so that the devices at the both ends work with an optimal capability.

SUMMARY

Embodiments of the present invention provide a port auto-negotiation method and a device, for implementing port auto-negotiation between high-speed Ethernet devices.

According to a first aspect, a port auto-negotiation method provided in an embodiment of the present invention includes:

configuring, by a first device, a first port of the first device as four subports, where each of the four subports includes a differential transceiver channel;

determining, by the first device from the four subports, at least one subport whose differential transceiver channel operates normally, and selecting some or all of the at least one subport as a normal subport;

sending, by the first device, capability information of the first port to a second device by using the normal subport, and receiving, by using the normal subport, capability information of a second port of the second device sent by the second device, where the capability information includes a port-supported differential transceiver channel combination mode; and configuring, by the first device, operating statuses of the four subports based on the capability information of the first port and the capability information of the second port, where the first device and the second device are high-speed Ethernet devices.

In a conventional port auto-negotiation solution, four differential transceiver channels between a first device and a second device operate in a bundled combination manner, and both ends of the combined four differential transceiver channels are respectively a first port of the first device and a second port of the second device. In the foregoing port auto-negotiation method provided in the first aspect, the first device configures the first port as four subports, namely, splits the first port into four subports, each of the four subports includes a differential transceiver channel, each of the four differential transceiver channels operates independently, and both ends of one differential transceiver channel are respectively one subport of the first device and one subport of the second device.

According to the foregoing port auto-negotiation method provided in the first aspect, port auto-negotiation can be implemented between the first device and the second device that are high-speed Ethernet devices. In the foregoing method, before the first device and the second device exchange port capability information, the first device and the second device separately configure a respective port as four subports, each subport includes a differential transceiver channel, and a differential transceiver channel of a subport that is between the first device and the second device and that is used to exchange the port capability information operates normally. For a scenario in which there is a faulty differential transceiver channel in a plurality of differential transceiver channels that form a port of a high-speed Ethernet device, if the conventional port auto-negotiation solution is used, the four differential transceiver channels between the first device and the second device operate in a bundled combination manner, and therefore the first device and the second device cannot communicate with each other in the foregoing scenario and port auto-negotiation cannot be implemented. If the port auto-negotiation method provided in the first aspect is used, the four differential transceiver channels between the first device and the second device operate independently; therefore, the first device and the second device can exchange the port capability information by using the normal subport, and port auto-negotiation can still be implemented between the first device and the second device that are high-speed Ethernet devices even in the scenario in which there is a faulty differential transceiver channel in a plurality of differential transceiver channels that form a port of a high-speed Ethernet device.

In a possible implementation, an operating parameter of the first port is set to different values, so that the four differential transceiver channels of the first port operate in a bundled combination manner or an independent manner. For example, when the operating parameter of the first port is set to a first value, the first port is configured as four subports, and each of the four subports includes a differential transceiver channel, that is, the four differential transceiver channels of the first port operate independently; when the operating parameter of the first port is set to a second value, the four differential transceiver channels of the first port operate in the bundled combination manner.

In a possible implementation, there are two operating statuses: operating-allowed and operating-forbidden. That an operating status of a subport is operating-allowed means that the subport is allowed to operate, that is, a differential transceiver channel of the subport is allowed to operate. That an operating status of a subport is operating-forbidden means that the subport is forbidden to operate, that is, a differential transceiver channel of the subport is forbidden to operate. In the first aspect, the configuring, by the first device, operating statuses of the four subports based on the capability information of the first port and the capability information of the second port is:

determining, by the first device based on a differential transceiver channel combination mode supported by the first port and a differential transceiver channel combination mode supported by the second port, a working mode supported by both the first port and the second port; and configuring, according to the working mode, an operating status of a subport with a normally operating differential transceiver channel in the four subports to be operating-allowed and an operating status of a remaining subport, other than the operating-allowed subport, of the four subports to be operating-forbidden. A configured first port of the first device includes one or more differential transceiver channels that are allowed to operate, when the configured first port includes a plurality of differential transceiver channels, the plurality of differential transceiver channels operate in a bundled combination manner. The configured first port meets both the capability information of the first port and the capability information of the second port.

In a possible implementation, there may be one or more normal subports, and when there are a plurality of normal subports, the first device exchanges the port capability information with the second device by using the following method:

sending, by the first device, the capability information of the first port to the second device by using each of the normal subports, and receiving, by using each of the normal subports, the capability information of the second port sent by the second device.

In this way, the first device may exchange the port capability information with the second device by using each subport whose differential transceiver channel operates normally. In the conventional port auto-negotiation solution, because the four differential transceiver channels between the first device and the second device operate in a bundled combination manner, if there is a faulty differential transceiver channel in the four differential transceiver channels of the first device, the first device and the second device cannot exchange the port capability information. As a result, port auto-negotiation between the first device and the second device cannot be implemented. In the port auto-negotiation method provided in the first aspect, because the four differential transceiver channels between the first device and the second device operate independently, even if there is a faulty differential transceiver channel in the four differential transceiver channels of the first device, the first device can still exchange the port capability information with the second device by using the subport whose differential transceiver channel operates normally, to implement port auto-negotiation between the first device and the second device.

In a possible implementation, when the first device determines that the differential transceiver channel of each of the four subports operates abnormally, the first device and the second device cannot communicate with each other in this case. As a result, the first device cannot implement port auto-negotiation with the second device by using the port auto-negotiation method provided in the first aspect. In this case, the first device determines that auto-negotiation fails, and configures the first port based on only the capability information of the first port, that is, configures the operating statuses of the four subports of the first device based on the capability information of the first port, and sets a port mode of the first port to a port mode corresponding to a configured first port. The first device may further send prompt information used for indicating that port auto-negotiation fails.

That the first device configures the operating statuses of the four subports of the first device based on only the capability information of the first port is: determining, by the first device based on the differential transceiver channel combination mode supported by the first port, a working mode supported by the first port; and configuring, according to the working mode, an operating status of a subport with a normally operating differential transceiver channel in the four subports to be operating-allowed and an operating status of a remaining subport, other than the operating-allowed subport, of the four subports to be operating-forbidden. A configured first port of the first device includes one or more operating differential transceiver channels. When the configured first port includes a plurality of differential transceiver channels, the plurality of differential transceiver channels operate in a bundled combination manner. The configured first port meets only the capability information of the first port.

In a possible implementation, after the first device determines that auto-negotiation fails, the first device may further determine a cause of an auto-negotiation failure, and a method includes:

determining, by the first device, whether a receive optical power of an in-service optical module of the first device falls inside a normal range; and if the receive optical power falls outside the normal range, determining, by the first device, that the cause of the auto-negotiation failure lies in an obstructed physical channel between the first device and the second device; or if the receive optional power falls inside the normal range, determining, by the first device, that the cause of the auto-negotiation failure lies in that a port mode of the second device does not support an auto-negotiation mode, or there is a link fault between the first device and the second device.

In a possible implementation, before the first device configures the first port as four subports, the first device determines that the physical channel between the first device and the second device is smooth. An obstructed physical channel between the first device and the second device makes the first device and the second device unable to communicate with each other. After determining that the physical channel between the first device and the second device is smooth, the port auto-negotiation method provided in the first aspect is executed. In this way, a failure in port auto-negotiation between the first device and the second device due to the obstructed physical channel between the first device and the second device is excluded. A method for determining, by the first device, that the physical channel between the first device and the second device is smooth is as follows:

when the optical module of the first device is in service, and the receive optical power of the optical module falls inside the normal range, determining, by the first device, that the physical channel between the first device and the second device is smooth. The optical module of the first device is connected to an optical module of the second device by using fiber, and the optical module of the first device is connected to the first port of the first device.

In a possible implementation, a differential transceiver channel of the normal subport uses a minimum data transmission rate supported by the differential transceiver channel, to exchange the port capability information between the first device and the second device.

A port auto-negotiation method of the second device is the same as the port auto-negotiation method of the first device, and details are not described herein again.

According to a second aspect, a first device provided in an embodiment of the present invention has functions for implementing the first device in the foregoing first aspect or any possible implementation. The functions may be implemented by using hardware, or implemented by executing corresponding software by hardware. The hardware or software includes one or more modules corresponding to the foregoing functions.

According to a third aspect, a port auto-negotiation system is provided, including the first device in the foregoing second aspect, and a second device that performs port auto-negotiation with the first device.

According to a fourth aspect, a computer storage medium is provided, adapted to store a computer software instruction used by the first device in the foregoing aspect, and the computer software instruction includes a program designed for executing the foregoing aspect.

DESCRIPTION OF EMBODIMENTS

Figure 1:
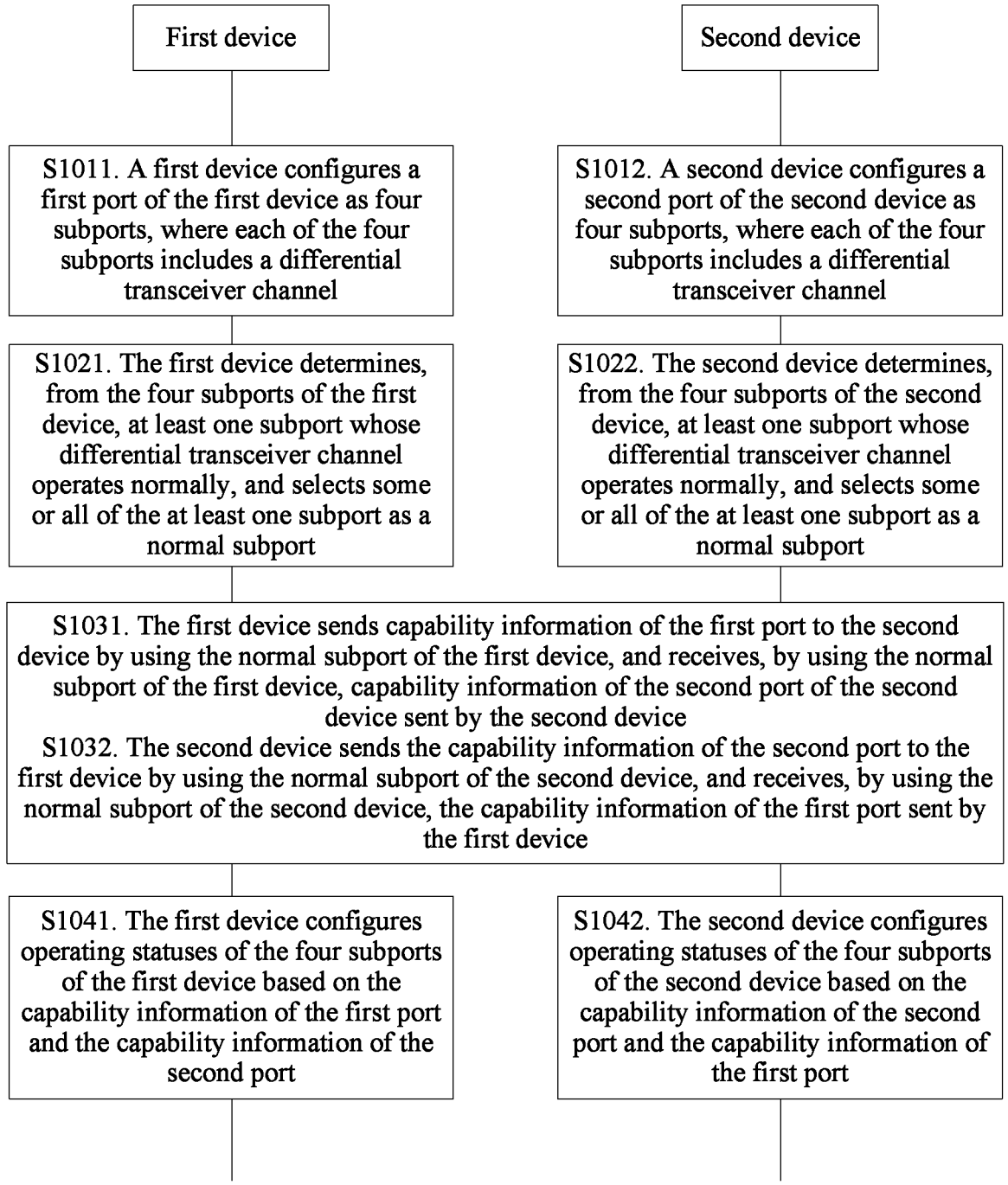
FIG. 1 is a schematic flowchart of a port auto-negotiation method according to an embodiment of the present invention.

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technical solutions provided in the embodiments of the present invention relate to a high-speed Ethernet. The high-speed Ethernet is specifically an Ethernet in which a data transmission rate of a device port reaches 40G or 100G. The two data transmission rates can meet different requirements of a server and a network. 40G is mainly suitable for server application and storage application, and 100G is mainly suitable for aggregation application and core network application. In July 2006, the Institute of Electrical and Electronics Engineers (IEEE) 802.3 formed a Higher Speed Study Group (HSSG) to define objectives of a high-speed Ethernet standard. In December 2007, the HSSG formally became the IEEE 802.3ba Task Force, with a task of formulating standards for implementing the high-speed Ethernet over fiber and copper cables.

A current high-speed Ethernet standard does not define a method for performing port rate auto-negotiation, referred to as port auto-negotiation below, between high-speed Ethernet devices. Port auto-negotiation indicates that devices at both ends of a link exchange negotiation information, such as a device operation mode, and then perform automatic port configuration according to the negotiation information of the devices at the both ends, so that the devices at the both ends work with an optimal capability. Therefore, the embodiments of the present invention provide a port auto-negotiation method and a device, to implement port auto-negotiation between a first device and a second device that are high-speed Ethernet devices. The method and the device are based on a same inventive concept. Because the method and the device use similar principles to resolve problems, implementation of the device and the method can be referenced mutually, and repeated parts are not described.

The first device and the second device in the embodiments of the present invention are both high-speed Ethernet devices, and a data transmission rate of a port of the high-speed Ethernet device may reach 40G or 100G. For example, the high-speed Ethernet device may be a switch, a router, a server, a storage device, or the like. A protocol standard mainly used by the high-speed Ethernet device is IEEE 802.3ba. A 100G port may be compatible with data transmission rates of 40G and 10G, and a 40G port may be compatible with a data transmission rate of 10G. The two ports have a same appearance, use same-size optical modules, and share fiber. The port of the high-speed Ethernet device includes a plurality of differential transceiver channels, and data transmission rates of the plurality of differential transceiver channels are the same. A port of a high-speed Ethernet device that is most widely applied currently includes four differential transceiver channels, and each differential transceiver channel is a channel that can implement serial communication. For physical implementation, one differential transceiver channel includes two serializer/deserializer (SerDes) links. Time-division multiplexing (TDM) and point-to-point serial communications technologies are used for the SerDes links. To be specific, a plurality of low-speed parallel signals at a transmit end are converted into high-speed serial signals, the high-speed serial signals are transmitted to a receive end by using a transmission medium (such as an optical cable or a copper wire), and the receive end converts the high-speed serial signals into the low-speed parallel signals again. This point-to-point serial communications technology fully utilizes a channel capacity of the transmission medium, and reduces a quantity of required transmission channels and component pins, thereby greatly reducing communications costs.

The following describes the technical solutions provided in the embodiments of the present invention in detail by using specific embodiments. It should be noted that a presentation sequence of the embodiments merely represents a sequence of the embodiments, and does not represent priorities of the technical solutions provided in the embodiments.

As shown in FIG. 1, an embodiment of the present invention provides a port auto-negotiation method, to implement port auto-negotiation between a first device and a second device that are high-speed Ethernet devices. In the method, a port auto-negotiation method on a first device side is the same as a port auto-negotiation method on a second device side. An interaction process between the first device and the second device is as follows:

S1011. The first device configures a first port of the first device as four subports, where each of the four subports includes a differential transceiver channel.

S1012. The second device configures a second port of the second device as four subports, where each of the four subports includes a differential transceiver channel.

It should be noted that a sequence for performing S1011 and S1012 is not limited in this embodiment.

S1021. The first device determines, from the four subports of the first device, at least one subport whose differential transceiver channel operates normally, and selects some or all of the at least one subport as a normal subport.

S1022. The second device determines, from the four subports of the second device, at least one subport whose differential transceiver channel operates normally, and selects some or all of the at least one subport as a normal subport.

It should be noted that a sequence for performing S1021 and S1022 is not limited in this embodiment. However, it should be limited that S1021 is performed after S1011, and S1022 is performed after S1012.

S1031. The first device sends capability information of the first port to the second device by using the normal subport of the first device, and receives, by using the normal subport of the first device, capability information of the second port of the second device sent by the second device.

S1032. The second device sends the capability information of the second port to the first device by using the normal subport of the second device, and receives, by using the normal subport of the second device, the capability information of the first port sent by the first device.

It should be noted that a sequence for performing S1031 and S1032 is not limited in this embodiment. However, it should be limited that S1031 is performed after S1021, and S1032 is performed after S1022.

S1041. The first device configures operating statuses of the four subports of the first device based on the capability information of the first port and the capability information of the second port.

S1042. The second device configures operating statuses of the four subports of the second device based on the capability information of the second port and the capability information of the first port.

It should be noted that a sequence for performing S1041 and S1042 is not limited in this embodiment. However, it should be limited that S1041 is performed after S1031, and S1042 is performed after S1032.

By using the port auto-negotiation method provided in FIG. 1, port auto-negotiation between the first device and the second device that are high-speed Ethernet devices can be implemented. In this embodiment, before the first device and the second device exchange port capability information, the first device and the second device separately configure a respective port as four subports, each subport includes a differential transceiver channel, and a differential transceiver channel of a subport that is between the first device and the second device and that is used to exchange the port capability information operates normally. For a scenario in which there is a faulty differential transceiver channel in a plurality of differential transceiver channels that form a port of a high-speed Ethernet device, if a conventional port auto-negotiation solution is used, the four differential transceiver channels between the first device and the second device operate in a bundled combination manner, and therefore the first device and the second device cannot communicate with each other in the foregoing scenario and port auto-negotiation cannot be implemented. If the port auto-negotiation method provided in this embodiment is used, the four differential transceiver channels between the first device and the second device operate independently; therefore, the first device and the second device can exchange the port capability information by using the normal subport, and port auto-negotiation can still be implemented between the first device and the second device that are high-speed Ethernet devices even in the scenario in which there is a faulty differential transceiver channel in a plurality of differential transceiver channels that form a port of a high-speed Ethernet device.

In the port auto-negotiation method provided in FIG. 1, because actions performed by the first device are the same as those performed by the second device, the following describes the port auto-negotiation method shown in FIG. 1 in detail by using the first device as an example.

The first device and the second device communicate with each other by using four differential transceiver channels. In the conventional port auto-negotiation solution, the four differential transceiver channels between the first device and the second device operate in a bundled combination manner, and both ends of the combined four differential transceiver channels are respectively a first port of the first device and a second port of the second device. According to the port auto-negotiation method provided in FIG. 1, using the first device as an example, in S1011, the first device configures the first port as four subports, that is, splits the first port into four subports, each of the four subports includes a differential transceiver channel, each of the four differential transceiver channels operates independently, and both ends of one differential transceiver channel are respectively one subport of the first device and one subport of the second device.

Optionally, in this embodiment, an operating parameter of the first port may be set to different values, so that the four differential transceiver channels of the first port operate in the bundled combination manner or an independent manner. For example, in S1011, when the operating parameter of the first port is set to a first value, the first port is configured as four subports, and each of the four subports includes a differential transceiver channel, that is, the four differential transceiver channels of the first port operate independently; when the operating parameter of the first port is set to a second value, the four differential transceiver channels of the first port operate in the bundled combination manner.

In S1021, the first device determines, from the four subports of the first device, the at least one subport whose differential transceiver channel operates normally, and selects some or all of the at least one subport as the normal subport, where the first device may select one or more normal subports. To be specific, if there is only one subport, of the four subports, whose differential transceiver channel operates normally, the first device may use the only one subport whose differential transceiver channel operates normally as the normal subport; and if there are a plurality of subports, of the four subports, whose differential transceiver channels operate normally, the first device may use all the plurality of subports whose differential transceiver channels operate normally as normal subports, or the first device may select some of the plurality of subports whose differential transceiver channels operate normally as the normal subport. The normal subport of the first device and the normal subport of the second device are respectively both ends of a differential transceiver channel.

A method for determining, by the first device from the four subports of the first device, the at least one subport whose differential transceiver channel operates normally includes: obtaining, by the first device, status information of each of the four subports, where the status information includes connected and disconnected; and determining, by the first device as a subport whose differential transceiver channel operates normally, a subport whose status information is connected. Optionally, the first device may detect, in a polling manner, whether status information of the four subports is connected, to determine, from the four subports, the subport whose differential transceiver channel operates normally.

If the first device determines a plurality of normal subports, S1031 specifically includes: sending, by the first device, the capability information of the first port to the second device by using each of the normal subports, and receiving, by using each of the normal subports, the capability information of the second port sent by the second device.

For example, assuming that the first device determines that subports whose differential transceiver channels operate normally in four subports 1 to 4 are the subport 1 and the subport 3, the subport 1 may be a normal subport used for exchanging the port capability information, or the subport 1 and the subport 3 may be normal subports used for exchanging the port capability information. For example, the subport 1 and the subport 3 are the normal subports. The first device sends the capability information of the first port to the second device by using the subport 1, and receives, by using the subport 1, the capability information of the second port sent by the second device; and sends the capability information of the first port to the second device by using the subport 3, and receives, by using the subport 3, the capability information of the second port sent by the second device.

Optionally, the first device may periodically send the capability information of the first port to the second device for a plurality of times by using the normal subport, and receive, for a plurality of times by using the normal subport, the capability information of the second port sent by the second device.

Further, if the capability information of the second port that is received by the first device for the plurality of times is the same, the received capability information of the second port may be used for auto-negotiation of the first port. If the capability information of the second port that is received by the first device for the plurality of times is different or the first device does not receive the capability information of the second port sent by the second device, communication between the first device and the second device at that time is abnormal, and after the first device exchanges the port capability information with the second device in S1031, the first device cannot continue to configure the operating statuses of the four subports based on the capability information of the first port and the capability information of the second port in S1041. In this case, the first device determines that auto-negotiation fails, and configures the first port based on only the capability information of the first port, that is, configures the operating statuses of the four subports of the first device based on the capability information of the first port, and sets a port mode of the first port to a port mode corresponding to a configured first port. The first device may further send prompt information used for indicating that port auto-negotiation fails. For example, if a data transmission rate of the configured first port is 40G, the first device sets the port mode of the first port to a 40G port mode.

There are two operating statuses: operating-allowed and operating-forbidden. That an operating status of a subport is operating-allowed means that the subport is allowed to operate, that is, a differential transceiver channel of the subport is allowed to operate. That an operating status of a subport is operating-forbidden means that the subport is forbidden to operate, that is, a differential transceiver channel of the subport is forbidden to operate. That the first device configures the operating statuses of the four subports of the first device based on only the capability information of the first port is:

determining, by the first device based on a differential transceiver channel combination mode supported by the first port, a working mode supported by the first port; and configuring, according to the working mode, an operating status of a subport with a normally operating differential transceiver channel in the four subports of the first device to be operating-allowed and an operating status of a remaining subport, other than the operating-allowed subport, of the four subports to be operating-forbidden. The configured first port of the first device includes one or more operating differential transceiver channels. When the configured first port includes a plurality of differential transceiver channels, the plurality of differential transceiver channels operate in the bundled combination manner. The configured first port meets only the capability information of the first port.

Preferably, when each differential transceiver channel operates independently, the differential transceiver channel uses a minimum data transmission rate supported by the differential transceiver channel, to exchange the port capability information between the first device and the second device. Generally, in a port auto-negotiation process, the first device and the second device need to select a data transmission rate supported by the ports at both ends. A data transmission rate of a port of a high-speed Ethernet device may reach 40G or 100G. Because a 100G port is compatible with 40G and the port includes four differential transceiver channels, a minimum data transmission rate supported by each differential transceiver channel of the high-speed Ethernet device is 10G. It should be noted that, when each differential transceiver channel operates independently, the differential transceiver channel may also use a rate higher than the minimum data transmission rate supported by the differential transceiver channel, provided that exchange of the port capability information between the first device and the second device can be implemented.

Optionally, in a process in S1031 that the first device and the second device exchange the port capability information, the first device and the second device may exchange the port capability information by exchanging a negotiation packet, and the port capability information is carried in the negotiation packet. A negotiation packet sent by the first device may include information such as a Media Access Control (MAC) destination address (DA), a MAC source address (SA), and the capability information of the first port, and may further include information such as a type field (EtherType), MAC operation code, a version number (Version), component error code (Err code) of the first device, the received capability information of the second port of the second device, a stage of port auto-negotiation, and four-byte check code of the negotiation packet.

In this embodiment, the negotiation packet for implementing exchange of the port capability information between the first device and the second device needs to carry at least port capability information of a transmit end device. Optionally, the negotiation packet may further carry information such as a MAC destination address, a MAC source address, and an Ethernet type. The MAC destination address, the MAC source address, and the Ethernet type in the negotiation packet are used to special types, so that the negotiation packet can be compatible with hardware. For example, as defined in the IEEE 802.3.31 standard, when the MAC destination address in the negotiation packet is a multicast address 01-80-C2-00-00-01, the MAC source address is a MAC address of a source port, and the Ethernet type/length field is 88-08, the negotiation packet is a MAC control frame. In this case, the negotiation packet is compatible with hardware. After a port of an Ethernet device is notified of the port capability information by using software, the port auto-negotiation process is implemented by MAC layer hardware of the Ethernet device.

Regarding S1041: the first device configures operating statuses of the four subports of the first device based on the capability information of the first port and the capability information of the second port.

In S1041, the port capability information may include a port-supported differential transceiver channel combination mode, and depending on an actual requirement of port auto-negotiation, the port capability information may further include information such as a port-supported data transmission rate, a quantity of differential transceiver channels that form a port, and serial numbers of the differential transceiver channels that form the port. The quantity of differential transceiver channels that form the port is four, the serial numbers of the differential transceiver channels that form the port include a serial number of each of the four differential transceiver channels that form the port, there may be one or more port-supported differential transceiver channel combination modes, and the differential transceiver channel combination mode is a set of differential transceiver channels that operate normally and that can be combined into the port in a bundled manner.

In S1041, there are two operating statuses: operating-allowed and operating-forbidden. That an operating status of a subport is operating-allowed means that the subport is allowed to operate, that is, a differential transceiver channel of the subport is allowed to operate; and that an operating status of a subport is operating-forbidden means that the subport is forbidden to operate, that is, a differential transceiver channel of the subport is forbidden to operate. In S1041, that the first device configures operating statuses of the four subports of the first device based on the capability information of the first port and the capability information of the second port is:

determining, by the first device based on a differential transceiver channel combination mode supported by the first port and a differential transceiver channel combination mode supported by the second port, a working mode supported by both the first port and the second port; and configuring, according to the working mode, an operating status of a subport with a normally operating differential transceiver channel in the four subports of the first device to be operating-allowed and an operating status of a remaining subport, other than the operating-allowed subport, of the four subports to be operating-forbidden. The configured first port includes one or more differential transceiver channels that are allowed to operate. When the configured first port includes a plurality of differential transceiver channels, the plurality of differential transceiver channels operate in a bundled manner. The configured first port meets both the capability information of the first port and the capability information of the second port, so that the first device and the second device can work with an optimal capability.

That the first device determines operating statuses of the four subports based on the capability information of the first port and the capability information of the second port is described by using the following examples.

Example 1

Assume that the capability information of the first port of the first device includes a port-supported data transmission rate of 40G and a port-supported differential transceiver channel combination mode being four differential transceiver channels with a data transmission rate of 10G, and the capability information of the second port of the second device includes a port-supported data transmission rate of 100G and three port-supported differential transceiver channel combination modes: A first mode includes four differential transceiver channels with the data transmission rate of 10G, a second mode includes four differential transceiver channels with a data transmission rate of 25G, and a third mode includes two differential transceiver channels with a data transmission rate of 50G. When the four differential transceiver channels of the first device and the second device all operate normally, and when the first device configures the operating statuses of the four subports based on the working mode supported by both the first port and the second port, the differential transceiver channels of the four subports are allowed to operate, and a data transmission rate of each differential transceiver channel is 10G. In other words, the configured first port of the first device includes four differential transceiver channels with the data transmission rate of 10G, and a data transmission rate of the configured first port is 40G. A configuration process of the second device is the same as that of the first device.

Example 2

Assume that the capability information of the first port of the first device includes a port-supported data transmission rate of 100G and three port-supported differential transceiver channel combination modes: A first mode includes four differential transceiver channels with a data transmission rate of 10G, a second mode includes four differential transceiver channels with a data transmission rate of 25G, and a third mode includes two differential transceiver channels with a data transmission rate of 50G; and the capability information of the second port of the second device is the same as the capability information of the first port of the first device. When the four differential transceiver channels of the first device and the second device all operate normally, and when the first device configures the operating statuses of the four subports based on the working mode supported by both the first port and the second port, the differential transceiver channels of the four subports are allowed to operate, and a data transmission rate of each differential transceiver channel is 25G. In other words, the configured first port of the first device includes four differential transceiver channels with the data transmission rate of 25G, and a data transmission rate of the configured first port is 100G. A configuration process of the second device is the same as that of the first device.

Example 3

Assume that the capability information of the first port of the first device includes a port-supported data transmission rate of 40G and a port-supported differential transceiver channel combination mode being four differential transceiver channels with a data transmission rate of 10G, and the capability information of the second port of the second device includes a port-supported data transmission rate of 100G and three port-supported differential transceiver channel combination modes: A first mode includes four differential transceiver channels with the data transmission rate of 10G, a second mode includes four differential transceiver channels with a data transmission rate of 25G, and a third mode includes two differential transceiver channels with a data transmission rate of 50G. If the differential transceiver channel 2 in four differential transceiver channels 1 to 4 of the first device and the second device is faulty and cannot operate normally, and when the first device configures the operating statuses of the four subports based on the working mode supported by both the first port and the second port, the differential transceiver channel 1 is allowed to operate, and a data transmission rate of the differential transceiver channel is 10G; the first device forbids operation of differential transceiver channels 2 to 4. In other words, the configured first port of the first device includes one differential transceiver channel with the data transmission rate of 10G, and a data transmission rate of the configured first port is 10G. A configuration process of the second device is the same as that of the first device.

Optionally, in a process of S1031 that the first device and the second device exchange the port capability information, if presence of a subport with a normally operating differential transceiver channel in the four subports of the first device becomes absence of the subport with the normally operating differential transceiver channel, communication between the first device and the second device in this case is abnormal. In this case, the first device determines that auto-negotiation fails, and configures the first port based on only the capability information of the first port, that is, configures the operating statuses of the four subports of the first device based on the capability information of the first port, and sets a port mode of the first port to a port mode corresponding to a configured first port. The first device may further send prompt information used for indicating that port auto-negotiation fails. For example, if a data transmission rate of the configured first port is 40G, the first device sets the port mode of the first port to a 40G port mode.

In a conventional port auto-negotiation method between high-speed Ethernet devices, there is a 40G port mode and a 100G port mode. The 40G port mode represents a port mode corresponding to a port data transmission rate of 40G, and the 100G port mode represents a port mode corresponding to a port data transmission rate of 100G. In the port auto-negotiation method between high-speed Ethernet devices provided in this embodiment, in addition to the conventional port modes, a port mode being an auto-negotiation mode may be added and is used to indicate that a device with a port mode being the auto-negotiation mode is in a port auto-negotiation process. Optionally, in a port auto-negotiation process between the first device and the second device, the first device and the second device may set a respective port mode to the auto-negotiation mode.

In this embodiment, optionally, before the first device configures the first port as four subports in S1011, the first device determines that a physical channel between the first device and the second device is smooth. An obstructed physical channel between the first device and the second device makes the first device and the second device unable to communicate with each other. After determining that the physical channel between the first device and the second device is smooth, the first device configures the first port as four subports in S1011. In this way, a failure in port auto-negotiation between the first device and the second device due to the obstructed physical channel between the first device and the second device is excluded. A method for determining, by the first device, that the physical channel between the first device and the second device is smooth is as follows:

detecting, by the first device, whether an optical module of the first device is in service, and when the optical module of the first device is in service, detecting whether a receive optical power of the optical module falls inside a normal range; and when the optical module of the first device is in service, and the receive optical power of the optical module falls inside the normal range, determining, by the first device, that the physical channel between the first device and the second device is smooth. Optionally, the first device may periodically detect whether the optical module of the first device is in service, and whether the receive optical power of the optical module falls inside the normal range.

The optical module of the first device is connected to an optical module of the second device by using fiber, and the optical module of the first device is connected to the first port of the first device. The optical module includes an optical electronic component, a functional circuit, an optical interface, and the like. The optical electronic component includes two parts: a transmit part and a receive part. A function of the optical module is optical-to-electrical conversion, the transmit part of the optical module converts an electrical signal into an optical signal, and the receive part of the optical module converts an optical signal into an electrical signal.

In this embodiment, when the first device determines, from the four subports of the first device, at least one subport whose differential transceiver channel operates normally in S1021, if the differential transceiver channel of each of the four subports of the first device operates abnormally, the first device and the second device cannot communicate with each other in this case. As a result, the first device cannot implement port auto-negotiation with the second device. In this case, the first device determines that auto-negotiation fails, and configures the first port based on only the capability information of the first port, that is, configures the operating statuses of the four subports of the first device based on the capability information of the first port, and sets the port mode of the first port to a port mode corresponding to a configured first port. The first device may further send prompt information used for indicating that port auto-negotiation fails. Generally, after determining that auto-negotiation fails, the first device may configure the first port with a maximum data transmission rate that can be supported by the first port.

That the first device configures the operating statuses of the four subports of the first device based on the capability information of the first port is: determining, by the first device based on only the differential transceiver channel combination mode supported by the first port, a working mode supported by the first port; and configuring, according to the working mode, an operating status of a subport with a normally operating differential transceiver channel in the four subports of the first device to be operating-allowed and an operating status of a remaining subport, other than the operating-allowed subport, of the four subports to be operating-forbidden. The configured first port of the first device includes one or more operating differential transceiver channels. When the configured first port includes a plurality of differential transceiver channels, the plurality of differential transceiver channels operate in the bundled combination manner. The configured first port meets only the capability information of the first port.

Optionally, after determining that auto-negotiation fails, the first device may further determine a cause of an auto-negotiation failure by using a method, including: when the differential transceiver channel of each of the four subports of the first device operates abnormally, and when the optical module of the first device is in service, determining, by the first device, whether the receive optical power of the optical module of the first device falls inside the normal range, where receive optical powers of optical modules of different types may be different; and if the receive optical power falls outside the normal range, determining, by the first device, that the cause of the auto-negotiation failure lies in the obstructed physical channel between the first device and the second device; or if the receive optical power falls inside the normal range, determining, by the first device, that the cause of the auto-negotiation failure lies in that a port mode of the second device does not support the auto-negotiation mode, or there is a link fault between the first device and the second device.

Figure 2:
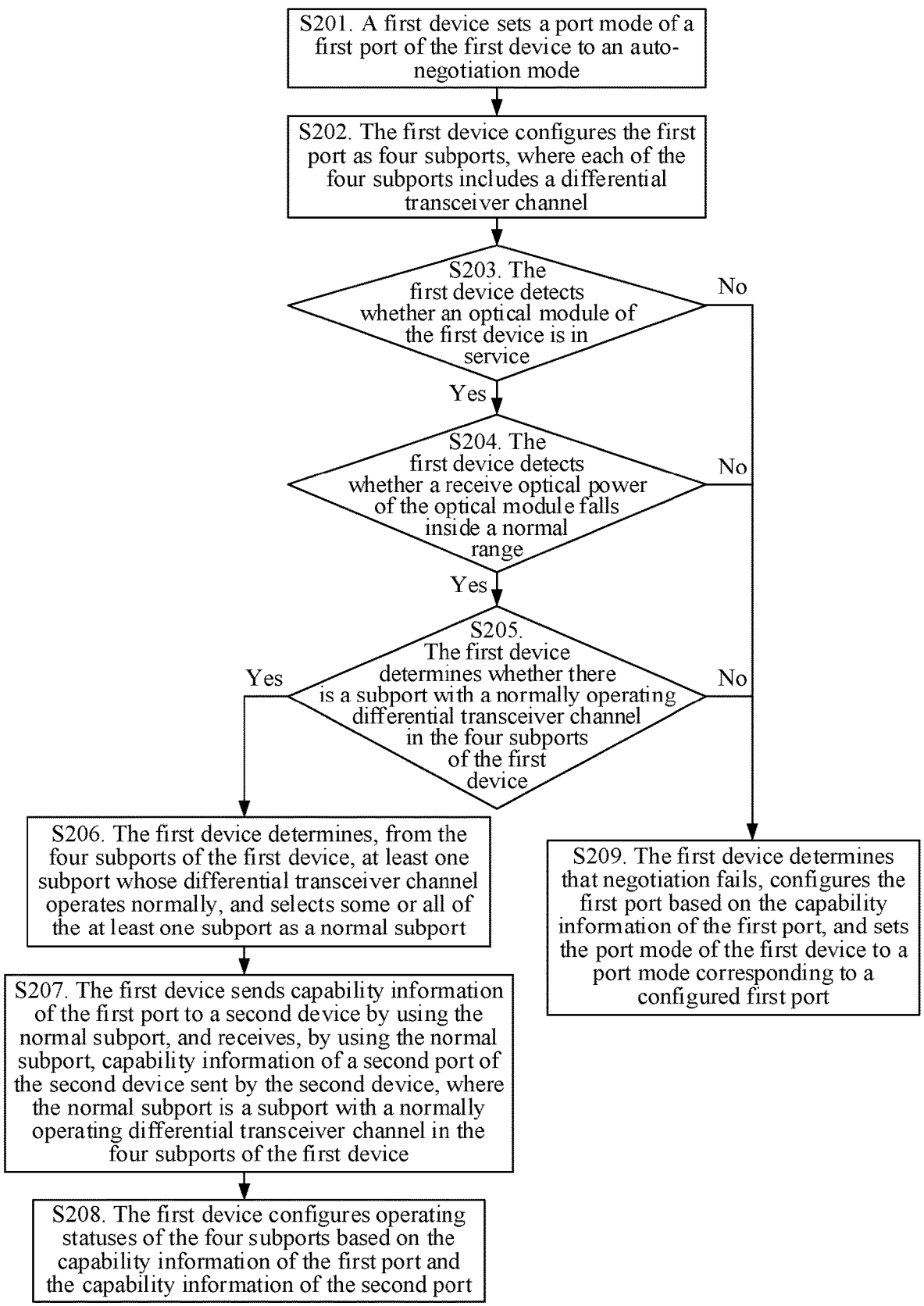
FIG. 2 is a schematic flowchart of a port auto-negotiation method performed by a first device according to an embodiment of the present invention.

An embodiment of the present invention provides a port auto-negotiation method, and a port auto-negotiation method on a first device side is the same as a port auto-negotiation method on a second device side. Using a first device as an example, for example, as shown in FIG. 2, the port auto-negotiation method on the first device side includes:

S201. The first device sets a port mode of a first port of the first device to an auto-negotiation mode.

S202. The first device configures the first port as four subports, where each of the four subports includes a differential transceiver channel.

S203. The first device detects whether an optical module of the first device is in service.

If yes, S204 is performed; otherwise, S209 is performed.

S204. The first device detects whether a receive optical power of the optical module falls inside a normal range.

If yes, S205 is performed; otherwise, S209 is performed.

S205. The first device determines whether there is a subport with a normally operating differential transceiver channel in the four subports of the first device.

If yes, S206 is performed; otherwise, S209 is performed.

S206. The first device determines, from the four subports of the first device, at least one subport whose differential transceiver channel operates normally, and selects some or all of the at least one subport as a normal subport.

S207. The first device sends capability information of the first port to a second device by using the normal subport, and receives, by using the normal subport, capability information of a second port of the second device sent by the second device, where the normal subport is a subport with a normally operating differential transceiver channel in the four subports of the first device.

S208. The first device configures operating statuses of the four subports based on the capability information of the first port and the capability information of the second port.

S209. The first device determines that negotiation fails, configures the first port based on the capability information of the first port, and sets the port mode of the first device to a port mode corresponding to a configured first port.

Because the differential transceiver channel of each of the four subports of the first device operates abnormally, the first device and the second device do not need to perform normal communication. Therefore, the first device configures the first port based on only the capability information of the first port of the first device, and does not need to configure the first port based on the capability information of the second port of the second device.

Optionally, after determining that negotiation fails, the first device may further send prompt information used for indicating that port auto-negotiation fails. Generally, after determining that auto-negotiation fails, the first device may configure the first port with a maximum data transmission rate that can be supported by the first port.

In conclusion, by using the foregoing method provided in this embodiment, port auto-negotiation between the first device and the second device that are high-speed Ethernet devices can be implemented. In this embodiment, before the first device and the second device exchange port capability information, the first device and the second device separately configure a respective port as four subports, each subport includes a differential transceiver channel, and a differential transceiver channel of a subport that is between the first device and the second device and that is used to exchange the port capability information operates normally. For a scenario in which there is a faulty differential transceiver channel in a plurality of differential transceiver channels that form a port of a high-speed Ethernet device, if the conventional port auto-negotiation solution is used, the four differential transceiver channels between the first device and the second device operate in a bundled combination manner, and therefore the first device and the second device cannot communicate with each other in the foregoing scenario and port auto-negotiation cannot be implemented. If the port auto-negotiation method provided in this embodiment is used, the four differential transceiver channels between the first device and the second device operate independently; therefore, the first device and the second device can exchange the port capability information by using the normal subport, and port auto-negotiation can still be implemented between the first device and the second device that are high-speed Ethernet devices even in the scenario in which there is a faulty differential transceiver channel in a plurality of differential transceiver channels that form a port of a high-speed Ethernet device.

Figure 3:
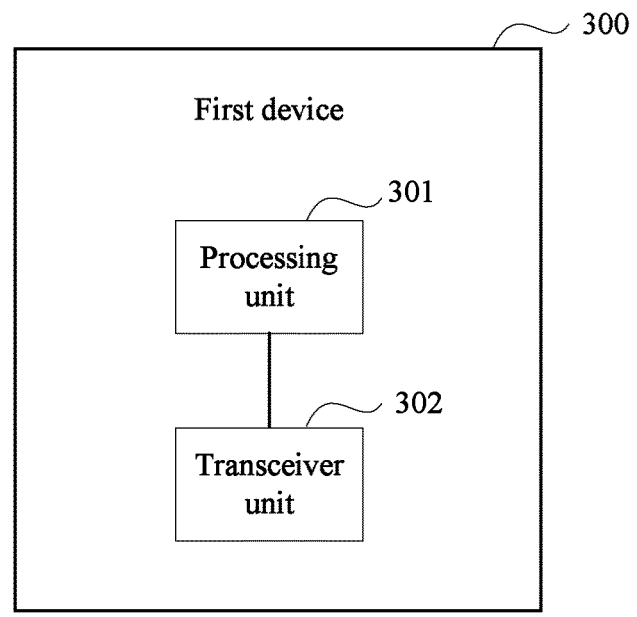
FIG. 3 is a schematic structural diagram of a first device according to an embodiment of the present invention.

Based on a same inventive concept, an embodiment of the present invention further provides a first device. The first device may execute the port auto-negotiation method provided in the present invention. Referring to FIG. 3, the first device 300 includes a processing unit 301 and a transceiver unit 302.

The processing unit 301 is adapted to configure a first port of the first device 300 as four subports, where each of the four subports includes a differential transceiver channel; and determine, from the four subports, at least one subport whose differential transceiver channel operates normally, and select some or all of the at least one subport as a normal subport.

The transceiver unit 302 is adapted to send capability information of the first port to a second device by using the normal subport selected by the processing unit 301, and receive, by using the normal subport selected by the processing unit 301, capability information of a second port sent by the second device, where the capability information includes a differential transceiver channel combination mode.

The processing unit 301 is further adapted to configure operating statuses of the four subports based on the capability information of the first port and the capability information of the second port that is received by the transceiver unit 302.

Both the first device 300 and the second device are high-speed Ethernet devices.

Optionally, when configuring the operating statuses of the four subports based on the capability information of the first port and the capability information of the second port, the processing unit 301 is specifically adapted to:

determine, based on a differential transceiver channel combination mode supported by the first port and a differential transceiver channel combination mode supported by the second port, a working mode supported by both the first port and the second port; and configure, according to the working mode, an operating status of a subport with a normally operating differential transceiver channel in the four subports to be operating-allowed and an operating status of a remaining subport, other than the operating-allowed subport, of the four subports to be operating-forbidden.

Optionally, the transceiver unit 302 is specifically adapted to:

when there are a plurality of normal subports, send the capability information of the first port to the second device by using each of the normal subports, and receive, by using each of the normal subports, the capability information of the second port sent by the second device.

Optionally, the processing unit 301 is further adapted to:

when determining that the differential transceiver channel of each of the four subports operates abnormally, determine that auto-negotiation fails, and configure the operating statuses of the four subports based on only the capability information of the first port.

Optionally, the processing unit 301 is further adapted to:

after determining that auto-negotiation fails, determine whether a receive optical power of an in-service optical module of the first device falls inside a normal range; and if the receive optical power falls outside the normal range, determine that a cause of an auto-negotiation failure lies in an obstructed physical channel between the first device and the second device; or if the receive optional power falls inside the normal range, determine that a cause of an auto-negotiation failure lies in that a port mode of the second device does not support an auto-negotiation mode, or there is a link fault between the first device and the second device.

It should be noted that, refer to the embodiment for description on specific functions of the foregoing units, and details are not described herein again. The unit division in this embodiment of the present invention is merely an example, and is merely logical function division and may be other division in actual implementation. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of the present invention. The foregoing storage medium includes: any medium that can store program code, such as a USB flash drive, a removable hard disk, a read-only memory (ROM), a random access memory (RAM), a magnetic disk, or an optical disc.

Figure 4:
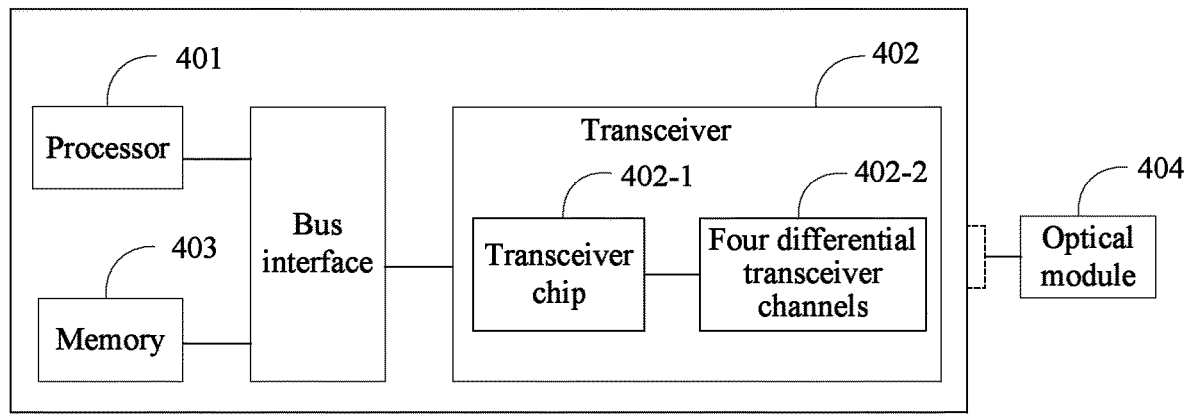
FIG. 4 is a schematic structural diagram of another first device according to an embodiment of the present invention.

Based on a same inventive concept, an embodiment of the present invention further provides a first device. The first device may execute a first device side method in the method provided in the present invention, and may be a device the same as the first device shown in FIG. 3. Referring to FIG. 4, the first device includes: a processor 401, a transceiver 402, and a memory 403. Optionally, the first device further includes an optical module 404. The optical module 404 is a pluggable component. Only when the optical module 404 of the first device is in service, port auto-negotiation between the first device and a second device may be implemented. As shown in FIG. 4, the transceiver 402 includes a transceiver chip 402-1 and four differential transceiver channels 402-2. The four differential transceiver channels 402-2 form a communications port of the transceiver 402, namely, a first port of the first device. Each of the four differential transceiver channels 402-2 is corresponding to one subport of the first device.

The processor 401 is adapted to read a program in the memory 403 and execute the following process.

The processor 401 is adapted to configure the first port of the first device as four subports, where each of the four subports includes a differential transceiver channel; and determine, from the four subports, at least one subport whose differential transceiver channel operates normally, and select some or all of the at least one subport as a normal subport; and send capability information of the first port to the second device by using the transceiver 402 and by using the normal subport, and receive, by using the transceiver 402 and by using the normal subport, capability information of a second port of the second device sent by the second device, where the capability information includes a differential transceiver channel combination mode.

The processor 401 is further adapted to configure operating statuses of the four subports of the first device based on the capability information of the first port of the first device and the capability information of the second port of the second device that is received by using the transceiver 402.

Both the first device and the second device are high-speed Ethernet devices.

Optionally, when configuring the operating statuses of the four subports based on the capability information of the first port and the capability information of the second port, the processor 401 is specifically adapted to:

determine, based on a differential transceiver channel combination mode supported by the first port and a differential transceiver channel combination mode supported by the second port, a working mode supported by both the first port and the second port; and configure, according to the working mode, an operating status of a subport with a normally operating differential transceiver channel in the four subports to be operating-allowed and an operating status of a remaining subport, other than the operating-allowed subport, of the four subports to be operating-forbidden.

Optionally, the processor 401 is further adapted to:

when there are a plurality of normal subports, send the capability information of the first port to the second device by using the transceiver 402 and by using each of the normal subports, and receive, by using the transceiver 402 and by using each of the normal subports, the capability information of the second port sent by the second device.

Optionally, the processor 401 is further adapted to:

when determining that the differential transceiver channel of each of the four subports operates abnormally, determine that auto-negotiation fails, and configure the operating statuses of the four subports based on the capability information of the first port.

Optionally, the processor 401 is further adapted to:

after determining that auto-negotiation fails, determine whether a receive optical power of the in-service optical module 404 of the first device falls inside a normal range; and if the receive optical power falls outside the normal range, determine that a cause of an auto-negotiation failure lies in an obstructed physical channel between the first device and the second device; or if the receive optional power falls inside the normal range, determine that a cause of an auto-negotiation failure lies in that a port mode of the second device does not support an auto-negotiation mode, or there is a link fault between the first device and the second device.

In FIG. 4, a bus architecture may include any quantity of interconnected buses and bridges, and specifically connects various circuits including one or more processors represented by the processor 401 and a memory represent by the memory 403. The bus architecture may further connect various other circuits such as a peripheral, a voltage stabilizer, and a power management circuit, which are known in the art. Therefore, further description is not made herein. A bus interface provides an interface. The processor 401 is responsible for managing the bus architecture and general processing. The memory 403 may store data that is used by the processor 401 when executing an operation. The memory 403 may be a memory of the first device, such as a hard disk, a USB flash drive, or a secure digital (SD) card.

An embodiment further provides a port auto-negotiation system, including the first device in the foregoing embodiment and a second device that performs port auto-negotiation with the first device.

An embodiment further provides a computer storage medium, adapted to store a computer software instruction used by the first device in the foregoing embodiment, and the computer software instruction includes a program designed for executing the foregoing embodiment.

By using the technical solutions provided in the embodiments of the present invention, port auto-negotiation between the first device and the second device that are high-speed Ethernet devices can be implemented. For a scenario in which there is a faulty differential transceiver channel in a plurality of differential transceiver channels that form a port of a high-speed Ethernet device, the foregoing method can still be used to implement port auto-negotiation between the first device and the second device that are high-speed Ethernet devices.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, a person skilled in the art can make changes and modifications to these embodiments once they learn the basic inventive concept. Therefore, the following claims are intended to be construed as to cover the embodiments and all changes and modifications falling within the scope of the present invention.

Obviously, a person skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. A port auto-negotiation method, comprising:
configuring, by a first device, a first port of the first device into four subports, wherein the first port of the first device is formed by four differential transceiver channels, and wherein each of the four subports is associated with one of the four differential transceiver channels;
determining, by the first device, from the four subports, at least one subport whose differential transceiver channel operates normally, and selecting one or more of the at least one subport as a normal subport;
sending, by the first device, capability information of the first port to a second device by using the normal subport, and receiving, by using the normal subport, capability information of a second port of the second device sent by the second device, wherein the capability information of the second port comprises a port-supported differential transceiver channel combination mode; and
configuring, by the first device, operating statuses of the four subports based on the capability information of the first port and the capability information of the second port, wherein
the first device and the second device are high-speed Ethernet devices.

2. The method according to claim 1, wherein the configuring, by the first device, the operating statuses of the four subports based on the capability information of the first port and the capability information of the second port comprises:

determining, by the first device based on a differential transceiver channel combination mode supported by the first port and a differential transceiver channel combination mode supported by the second port, a working mode supported by both the first port and the second port; and configuring, according to the working mode, an operating status of a subport with a normally operating differential transceiver channel in the four subports to be operating-allowed and an operating status of a remaining subport, other than the operating-allowed subport, of the four subports to be operating-forbidden.

3. The method according to claim 2, further comprising: when the first device determines that the differential transceiver channel of each of the four subports operates abnormally, determining, by the first device, that auto-negotiation fails, and configuring the operating statuses of the four subports based on only the capability information of the first port.

4. The method according to claim 3, wherein after the determining, by the first device, that the auto-negotiation fails, the method further comprises:

determining, by the first device, whether receive optical power of an in-service optical module of the first device falls inside a normal range; and when the receive optical power falls outside the normal range, determining, by the first device, that a cause of an auto-negotiation failure lies in an obstructed physical channel between the first device and the second device;

when the receive optional power falls inside the normal range, determining, by the first device, that a cause of an auto-negotiation failure lies in that a port mode of the second device does not support an auto-negotiation mode, or there is a link fault between the first device and the second device.

5. The method according to claim 1, wherein when there are a plurality of normal subports, the sending, by the first device, capability information of the first port to a second device by using the normal subport, and receiving, by using the normal subport, capability information of a second port sent by the second device comprises:

sending, by the first device, the capability information of the first port to the second device by using each of the normal subports, and receiving, by using each of the normal subports, the capability information of the second port sent by the second device.

6. The method according to claim 1, wherein the configuring, by the first device, the first port of the first device into the four subports comprises:

setting an operating parameter of the first port to a first value, to configure the first port into the four subports.

7. A first device comprising: a processor, a transceiver and a memory, wherein the transceiver comprises a transceiver chip and four differential transceiver channels;

wherein the four differential transceiver channels form a first port of the first device;

wherein the processor is configured to configure a first port of the first device into four subports, wherein each of the four subports is associated with one of the four differential transceiver channels; and determine, from the four subports, at least one subport whose differential transceiver channel operates normally, and select one or more of the at least one subport as a normal subport;

the transceiver is configured to send capability information of the first port to a second device by using the normal subport selected by the processor, and receive, by using the normal subport selected by the processor, capability information of a second port sent by the second device, wherein the capability information of the second port comprises a port-supported differential transceiver channel combination mode;

the processor is further configured to configure operating statuses of the four subports based on the capability information of the first port and the capability information of the second port that is received by the transceiver; and wherein the first device and the second device are high-speed Ethernet devices.

8. The device according to claim 7, wherein when configuring the operating statuses of the four subports based on the capability information of the first port and the capability information of the second port, the processor is further configured to:

determine, based on a differential transceiver channel combination mode supported by the first port and a differential transceiver channel combination mode supported by the second port, a working mode supported by both the first port and the second port; and configure, according to the working mode, an operating status of a subport with a normally operating differential transceiver channel in the four subports to be operating-allowed and an operating status of a remaining subport, other than the operating-allowed subport, of the four subports to be operating-forbidden.

9. The device according to claim 8, wherein the processor is further configured to:

when determining that the differential transceiver channel of each of the four subports operates abnormally, determine that auto-negotiation fails, and configure the operating statuses of the four subports based on only the capability information of the first port.

10. The device according to claim 9, wherein the processor is further configured to:

after determining that auto-negotiation fails, determine whether a-receive optical power of an in-service optical module of the first device falls inside a normal range; and when the receive optical power falls outside the normal range, determine that a cause of an auto-negotiation failure lies in an obstructed physical channel between the first device and the second device;

when the receive optional power falls inside the normal range, determine that a cause of an auto-negotiation failure lies in that a port mode of the second device does not support an auto-negotiation mode, or there is a link fault between the first device and the second device.

11. The device according to claim 7, wherein the transceiver is further configured to:

when there are a plurality of normal subports, send the capability information of the first port to the second device by using each of the normal subports, and receive, by using each of the normal subports, the capability information of the second port sent by the second device.

12. The device according to claim 7, wherein the processor is further configured to set an operating parameter of the first port to a first value, to configure the first port into the four subports.

13. A non-transitory computer-readable medium, having processor-executable instructions stored there on, which when executed by a processor of a first device, cause the first device to perform operations including:
- configuring a first port of the first device as four subports, wherein the first port of the first device is formed by four differential transceiver channels, and wherein each of the four subports is associated with one of the four differential transceiver channels;
- determining from the four subports, at least one subport whose differential transceiver channel operates normally, and selecting one or more of the at least one subport as a normal subport;
- sending capability information of the first port to a second device by using the normal subport, and receiving by using the normal subport, capability information of a second port of the second device sent by the second device, wherein the capability information of the second port comprises a port-supported differential transceiver channel combination mode; and
- configuring operating statuses of the four subports based on the capability information of the first port and the capability information of the second port, wherein the first device and the second device are high-speed Ethernet devices.

14. The non-transitory computer-readable medium according to claim 13, wherein the operations further include:
- determining based on a differential transceiver channel combination mode supported by the first port and a differential transceiver channel combination mode supported by the second port, a working mode supported by both the first port and the second port; and
- configuring, according to the working mode, an operating status of a subport with a normally operating differential transceiver channel in the four subports to be operating-allowed and an operating status of a remaining subport, other than the operating-allowed subport, of the four subports to be operating-forbidden.

15. The non-transitory computer-readable medium according to claim 14, wherein when determining that the differential transceiver channel of each of the four subports operates abnormally, the operations further include:
- determining that auto-negotiation fails, and configuring the operating statuses of the four subports based on only the capability information of the first port.

16. The non-transitory computer-readable medium according to claim 15, wherein after determining that auto-negotiation fails, the operations further include:
- determining whether receive optical power of an in-service optical module of the first device falls inside a normal range; and
- when the receive optical power falls outside the normal range, determining that a cause of an auto-negotiation failure lies in an obstructed physical channel between the first device and the second device;
- when the receive optional power falls inside the normal range, determining that the cause of an auto-negotiation failure lies in that a port mode of the second device does not support an auto-negotiation mode, or there is a link fault between the first device and the second device.

17. The non-transitory computer-readable medium according to claim 13, wherein when there are a plurality of normal subports, the operations further include:
- sending the capability information of the first port to the second device by using each of the normal subports, and receiving, by using each of the normal subports, the capability information of the second port sent by the second device.

18. The non-transitory computer-readable medium according to claim 13, wherein the operations further include:
- setting an operating parameter of the first port to a first value, to configure the first port into the four subports.

* * * * *

UNITED STATES PATENT AND TRADEMARK OFFICE
CERTIFICATE OF CORRECTION

PATENT NO. : 10,826,847 B2
APPLICATION NO. : 16/399500
DATED : November 3, 2020
INVENTOR(S) : Kong et al.

It is certified that error appears in the above-identified patent and that said Letters Patent is hereby corrected as shown below:

In the Claims

Claim 7: Column 22, Line 3: "capability information of a second port sent by the" should read -- capability information of a second port of the second device sent by the --.

Claim 10: Column 22, Line 41: "whether a-receive optical power of an in-service optical" should read -- whether receive optical power of an in-service optical --.

Signed and Sealed this
Nineteenth Day of April, 2022

Katherine Kelly Vidal
*Director of the United States Patent and Trademark Office*